Nov. 15, 1960     H. C. SMITH, JR     2,960,402
ALLOYS
Original Filed Jan. 21, 1958
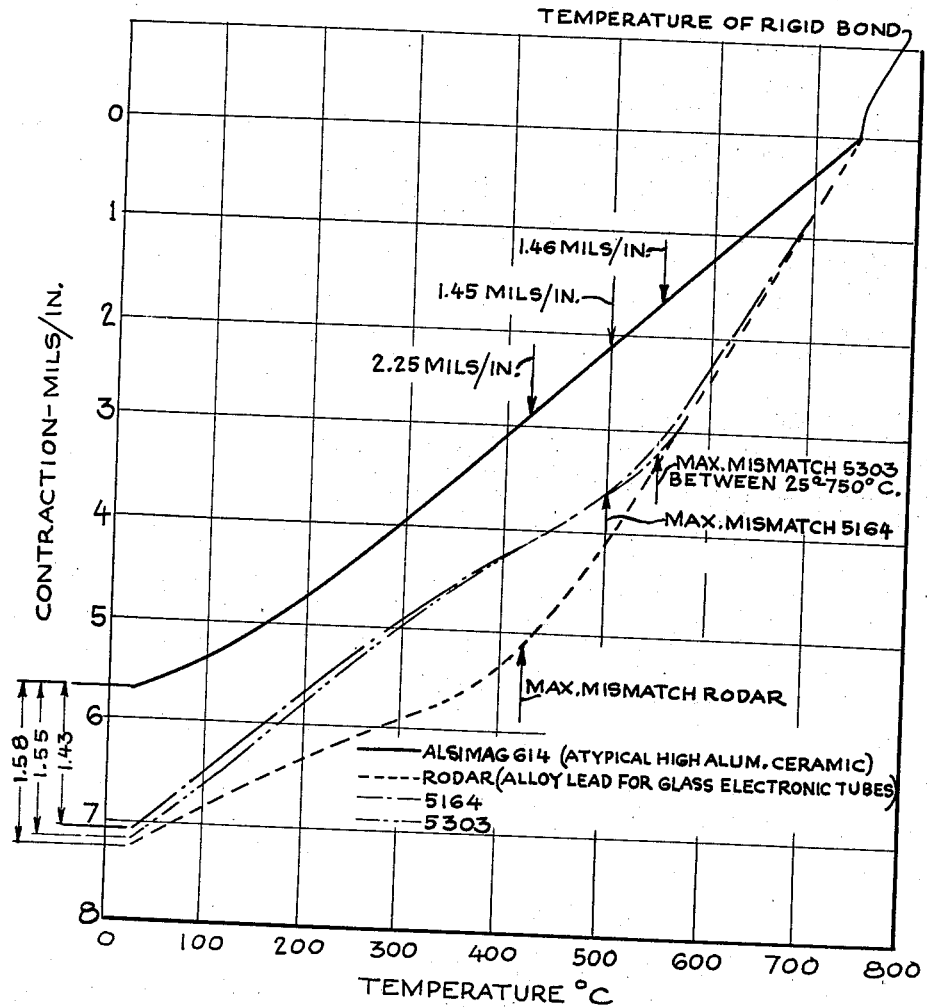

United States Patent Office 2,960,402
Patented Nov. 15, 1960

2,960,402
ALLOYS

Harry Clark Smith, Jr., Upper Montclair, N.J., assignor to Wilbur B. Driver Company, Newark, N.J., a corporation of New Jersey Continuation of application Ser. No. 710,264, Jan. 21, 1958. This application Oct. 6, 1959, Ser. No. 844,681

6 Claims. (Cl. 75—170)

This invention relates to alloys consisting essentially of iron, nickel, and cobalt.

As is known, glass is normally used as a container, or envelope, for electrical discharge devices. For ordinary leaded, or soft glass, no substantial problems have been experienced in providing leads for the electrical discharge elements which have appropriate expansivity and contraction characteristics to form and retain hermetic seals with the glass when the glass is heated to annealing temperatures and thereafter permitted to cool to room temperature before being used. For instance, ordinary nickel-steel alloys jacketed with copper have proven satisfactory. For certain types of high melting hard glass, such as boro-silicate glass, some difficulty has been experienced in finding leads which have characteristics suitable for forming and retaining hermetic seals with this type of glass. Yet this type of glass is, at times, needed in modern electronic equipment. Special iron-nickel-cobalt alloys have been developed and proven most economical and satisfactory for the purpose of forming vacuum-tight seals with such glass envelopes. Yet all types of glass begin to lose their dielectric properties when electrical discharge devices are operated at high frequencies and at elevated temperatures.

On the other hand, high alumina ceramics are known to retain their dielectric properties at high frequencies and are known to have good strengths at elevated temperatures. Thus, electronic manufacturers have been interested for some time in the substitution of high alumina ceramics as a vacuum tube envelope for electrical discharge devices. Yet the special alloy leads heretofore developed for use with glass envelopes have not proven satisfactory as leads for such ceramic envelopes, since they are not well adapted for forming and retaining hermetic seals with high alumina ceramics. As a result, high alumina ceramics have not heretofore been successfully used for vacuum tubes or the like. For the same reasons, it has been very difficult to form satisfactory hermetic seals with high alumina ceramics used for other purposes such as for bushings used in small transformers developed for aircraft use.

It is a principal object of this invention to provide alloys having expansion and contraction properties sufficiently close to those of high alumina ceramics to permit forming and retaining hermetic seals between the alloy and high alumina ceramics.

It is a special object of the invention to provide alloys adapted for use as a lead which will form a vacuum-tight seal through a high alumina ceramic envelope for a vacuum tube containing an electric discharge device.

It is an important object of the invention to provide an alloy which will have a maximum contraction mismatch between hermetic sealing temperatures with a high alumina ceramic and room temperature which does not substantially exceed the mismatch at room temperatures.

Other objects of the invention will be apparent from the description of the invention which follows.

It has been discovered that the foregoing and other objects of the invention can be achieved by providing a basically ternary alloy consisting essentially of 24–29% cobalt, and the remainder substantially only nickel and iron in a ratio of about 56–57:100. Customarily, such an alloy may contain about 1%, or less, of manganese and other impurities. Very satisfactory alloys have been prepared having from 24–25% cobalt, say about 24.5 cobalt, and the remainder substantially only nickel and iron in the stated ratio. For instance, such an alloy could consist essentially of about 26.7% nickel, 24.5% cobalt and the remainder substantially iron. More particularly, an alloy, designated herein as alloy 5164, containing about 26.80% nickel, about 24.44% cobalt, about 47.31% iron and about .49% manganese has proved well adapted for use as a lead for a high frequency electrical discharge device and yet will form a vacuum-tight seal with a high alumina ceramic, preferably containing 90–95% alumina, serving as a vacuum envelope for the discharge device. Vacuum tubes provided with such leads retain the originally established vacuum-tight seal and have the advantage of retaining their dielectric properties after extended use at high frequencies, and where necessary, at elevated temperatures.

Another, but slightly less-advantageous, alloy designated herein as alloy 5303 has been prepared containing about 25.5% nickel, 28.5% cobalt, and about 46.3% iron.

Such alloys may be hermetically sealed to such high alumina ceramics for use in other devices such as the transformer bushings previously mentioned.

It will be understood that a high alumina ceramic, as used herein, relates to a ceramic containing 85–95% alumina, preferably 90–95% alumina, and the remainder principally silica. It may also include some complex silicates as impurities.

The advantages of this invention will become apparent from a comparison of the contraction characteristics of a high alumina ceramic containing 90–95% alumina with (a) a typical iron-nickel-cobalt alloy, widely used as a lead for vacuum tubes made of glass and (b) the above mentioned alloys 5164 and 5303. Suiable high alumina ceramics containing 90–95% alumina are available from various sources, but such a ceramic obtainable from the American Lava Corporation, Chattanooga 5, Tennessee, under the designation of "Alsimag 614," has been used for purposes of comparison. Iron-nickel-cobalt alloy leads for glass vacuum tubes are available from various sources. An alloy containing about 29.0% nickel, 17.5% cobalt, 53.2% iron, and 0.3 manganese, obtainable from Wilbur B Driver Company, Newark, N.J., under the designation of Rodar is considered representative and has been used for purposes of comparison.

The comparisons are shown in the table below. In the table, the contraction mismatch is expressed in mils/inch and is determined by assuming the ceramic and the alloy have the same dimensions at 750° C., which is the melting point of a typical silver solder used for brazing the ceramic and the metal together. The inflection temperature is the temperature at which the rates of contraction or expansion of the respective alloys increase.

| Alloy | Ni | Fe | Co | Mn | Inflection Temp. °C. | Max. Mismatch from Alsimag 614 Mils/Inch | Temperature Max. Mismatch °C. |
|---|---|---|---|---|---|---|---|
| Rodar | 29.0 | 53.2 | 17.5 | .30 | 437 | 2.2 | 410 |
| 5164 | 26.80 | 47.31 | 24.44 | .49 | 542 | 1.45 | 500 |
| 5303 | 25.2 | 46.3 | 28.5 | | 570 | 1.55 | 25 |

These relations will become apparent from the accompanying graph showing contraction in mils/inch over a temperature range varying from brazing temperatures of 750° C. and a room temperature of 25° C. From this graph it will be seen that the maximum mismatch and the mismatch at room temperature of alloy 5164 are substantially the same, namely, 1.45 mils/inch and 1.43 mils/inch, respectively. On the other hand, alloy 5303 has its greatest mismatch at 25° C., namely 1.55, and the greatest mismatch between room temperature 750° C. at 550° C. namely, 1.46 mils/inch. These two values likewise are very close. It will be observed that the maximum mismatch of the Rodar standard in each instance is almost 50% more than that of alloy 5164 and alloy 5303.

This application is a continuation of the application of Harry Clark Smith, Jr., Serial No. 710,264, filed January 21, 1958, now abandoned.

It will be understood that the foregoing description of particular embodiments of the invention are for illustrative purposes and that modifications in details may be made by those skilled in the art without departing from the scope or spirit of the invention as defined in the appended claims.

I claim:
1. An alloy consisting essentially of about 24–29% cobalt and the remainder nickel and iron in a ratio of about 56–57:100.
2. An alloy consisting essentially of about 26.7% nickel, about 24.5% cobalt and the remainder substantially iron.
3. An alloy consisting essentially of about 26.80% of nickel, about 24.44% of cobalt and about 47.31% iron.
4. An alloy consisting essentially of 24–25% cobalt, and the remainder substantially nickel and iron in a ratio of about 56–57:100.
5. An alloy consisting essentially of about 25.2% nickel, 28.5% cobalt, and about 46.3% iron.
6. As an article of manufacture, a composite structure comprising a high alumina ceramic bonded to an alloy consisting essentially of 24–29% cobalt and the remainder substantially nickel and iron in the ratio of about 56–57:100, said structure providing a vacuum-tight seal at the bond between the ceramic and the alloy.

References Cited in the file of this patent

Scott: Transactions of the A.I.M.E (Institute of Metals Division), 1930, pages 506–537.

Metals Handbook, 1948 ed., page 173.